Dec. 14, 1965   B. L. LEWIS   3,223,841
PIN HOLE WIDE-ANGLE TRACKER
Filed Oct. 16, 1961   2 Sheets-Sheet 1

INVENTOR
BERNARD L. LEWIS
BY Hurwitz and Rose
ATTORNEYS

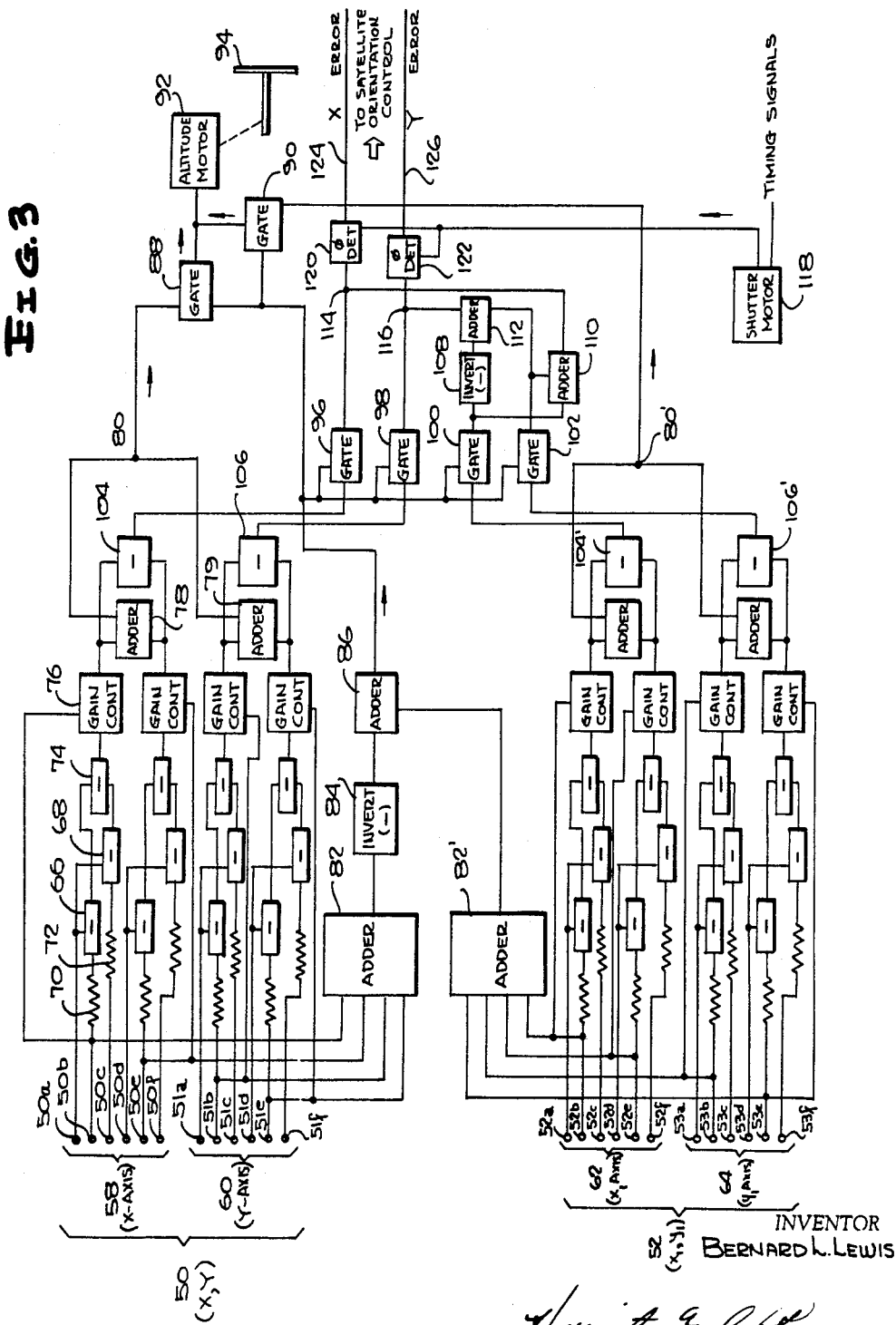

3,223,841
PIN HOLE WIDE-ANGLE TRACKER
Bernard L. Lewis, Winter Park, Fla., assignor to Radiation, Incorporated, Melbourne, Fla., a corporation of Florida
Filed Oct. 16, 1961, Ser. No. 145,097
13 Claims. (Cl. 250—83.3)

The present invention relates to a pin hole wide-angle tracker and more particularly to a pin hole wide-angle tracker for use in determining the direction and the distance therefrom to the center of an object having a discernible horizon such as a planet, and for stabilization of a vehicle to which the pinhole detector may be attached.

In the control and stabilization of space vehicles or orbiting satellites, it is sometimes necessary or desirable that one side of the satellite always be pointed toward the center of the body around which the satellite is orbiting. The line between the orbiting satellite and the center of the orbited body is designated as "the local vertical." Since it is desired to maintain one side of the satellite pointed toward the center of the orbited body, that is, in the direction of the local vertical, the pin hole wide-angle tracker of the invention senses the direction of the local vertical. In addition it is also necessary to determine the distance from the orbiting satellite to the center of the orbited body. Ordinarily, the distance between the orbiting satellite and the center of the orbited body is changing because the orbiting satellite may be describing an elliptical orbit about the orbited body, that is, an orbit having a perigee and an apogee. It is highly advantageous to have the distance determining equipment, which is mounted on the satellite, continually supply input data to other equipment mounted therein. This equipment may be, for example, a stabilization rocket or telemetry equipment.

It is therefore an object of the invention to determine the direction of the line and the distance between an image detector and the center of a generally circular body.

It is another object of the invention to determine the direction of the line and the distance from an orbiting vehicle to the center of an orbited body.

It is yet another object of the invention to provide means for the stabilization of an orbiting satellite in a given orientation.

It is a further object of the invention to determine the distance between the orbiting vehicle and the orbited body during the same process as determining the direction of the line between the orbiting vehicle and the center of the orbited body.

Another object of the invention is to compensate for ambient light during the process of determining the direction and the distance to the center of the orbited body as seen from the orbiting vehicle.

According to the invention means are provided to translate an image of an orbited body into electrical energy proportional to the intensity of the image, said image being received through a pin hole. Ordinarily, the image received by the orbiting body will be that which includes the horizon of the orbited body, and the horizon will be a circle of diameter less than that of a great circle of the orbited body, that is, a small circle of the orbited body. The image received in the orbiting body, for example, a space vehicle, may be divided into quadrants which oppose each other. Electrical energy representing the image intensity of each pair of opposing quadrants is then compared. When the energies in the opposing quadrants are equal to each other, the plane containing the image of the orbited body is perpendicular to the local vertical. At such time, the local vertical is then, of course, passing through the center of the image plane. If the energies in the opposing quadrants are not equal to each other, error signals will be provided for orientation control of the satellite, as explained hereinafter. Means are also provided to compensate for the difference in the intensity of light on the surface of the orbited body due to day break and night fall. In addition, means are provided for compensating for ambient light caused by other heavenly bodies such as the moon and sun being included in the image received in the orbiting body.

According to one embodiment of the invention when the image of the orbited body, for example, a planet, is in a plane perpendicular to the local vertical, means are also provided for automatic readout of the distance of the satellite from the center of the orbited body simultaneously with the sensing of the direction of the local vertical. In order to provide this automatic readout of distance, all that need be known is the actual diameter of the planet and the angle to the local vertical subtended by a line to the horizon of the planet.

According to one embodiment of the invention, there is mounted in the satellite or suitably fastened thereto, a housing having a pin hole therein. A movable piston is mounted in the housing, and on the face of the piston are three groups of thermistors arranged in the form of three concentric circles. A motor is provided to drive the piston toward or away from the pin hole through which the image of the orbited body is received. The three concentric circles of thermistors may be divided into sectors, each sector consisting of a group of three thermistors. The motor positions the piston until the central circle of thermistors, that is the central thermistor in each group of three in a sector, "sees" the planet's horizon in the center of the pin hole. When the central thermistors "see" the horizon of the orbited planet, the amount of electrical energy translated from the image thereon will be at some point between that received by the inner thermistors and the outer thermistors since the outer thermistors will be receiving an image from outside of the horizon and the inner thermistors will be receiving an image from within the horizon. Obviously the image from within the horizon will be much brighter than that at the horizon, and the image at the horizon will be much brighter than that outside of the horizon. When a maximum difference in energy among the image intensities of the various thermistors occurs, the piston is positioned at such a distance from the pin hole that the horizon image falls on the central thermistors. Specifically, the energy of the outer thermistors is subtracted from that of the inner and central thermistors to derive an error signal indicative of the distance between the actual plane of the thermistors and the plane they should occupy for a correct altitude reading. Prior to the subtraction operation, the electrical energy representing the image intensities of the inner and central thermistors are attenuated to a degree proportional to the intensity of the image received thereat. Thus, when the piston is in correct position for determining the direction of the local vertical and the distance of the pin hole from the center of the orbited body, the electrical energy of the outer thermistor subtracted from that of the attenuated inner and central thermistors in each group is zero.

The distance of the satellite to the center of the planet is automatically read out in response to the distance between the piston and pin hole when the piston is positioned so a zero error signal is derived. Since the diameter of the orbited body is known (for example, the diameter of a planet such as Earth, Mars, Venus, etc.), and because the angle between the line from the satellite to the horizon of the planet and a radius of the planet is a right angle, and since when the piston is in its proper position the angle between the local vertical and the central thermistor is known, there is sufficient information to compute the distance between the satellite and the center of the planet. This distance is, of course, the hypotenuse of the right triangle formed as described. Since the angle between the central thermistor and the local vertical may be plotted or marked for every position of the piston, marks may be longitudinally located on the piston shaft so that they may be sensed and readout directly for use in the orbiting space vehicle.

A feature of the invention is the provision of normalizing circuitry for compensating against the effects of brightness differences across the planet's surface. This is carried out by providing a gain control which is made inversely proportional to the amplitude of the image signals picked up on the thermistors of each group. These resultant normalized signals of each pair of opposing thermistors groups are subtracted to obtain a signal proportional to the offset of the piston shaft axis with the local vertical.

Another feature of the invention provides for the elimination of the effects of ambient images of heavenly bodies caused, for example, by sunrise, or sunset, moonrise or moonset. This is carried out by providing two complete sets of coordinate groups of thermistors, each arranged in a rectangular coordinate relationship and displaced from each other by a 45° angle. For example, one coordinate system of thermistors consists of thermistors which establish X and Y coordinates; the second group of thermistors is rotated 45 degrees from the first group and establishes coordinates $X_1$, $Y_1$. If an image of the sun or moon appears as an image on one set of coordinates, circuitry is provided to switch to the other set of thermistors establishing a second set of coordinates. Circuitry is provided to transform from one coordinate system to another coordinate system for consistency in relation to the control of the satellite.

These and other objects and features of the invention will be better understood by referring to the accompanying drawings, in which like numerals are employed to designate like parts throughout the same, and in which FIGURE 1 is an illustrative diagram of the wide angle pin hole detector of the invention;

FIGURE 3 is a schematic diagram of the invention; and

Figure 1:
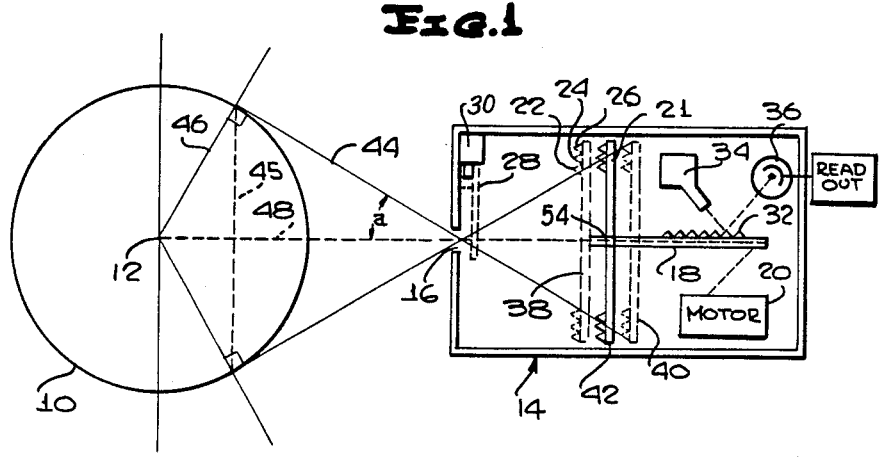

Referring to FIGURE 1, a planet or other nearby body from which lines may converge to form an image at the pin hole detector of the invention is shown at 10. The center of the planet is indicated at 12. The pin hole wide-angle detector of the invention is shown in an enlarged diagrammatical illustration at 14. The pin hole detector unit has a pin hole indicated at 16 through which light reflected or emanating from the nearby body, say, a planet, may pass. A reciprocating piston 18 driven by a motor 20 may be controlled by circuitry, to be discussed hereinafter in more detail, to be moved controllably back and forth in unit 14. Mounted on the face 21 of piston 18 are three concentric circular thermistor elements, the inner element being shown at 22, the center element at 24 and the outer element at 26. A rotating shutter adjacent the pin hole is shown at 28 and is driven by a suitable timing motor 30. Timing motor 30 also provides the timing signals to control the synchronization of the detector unit.

The shaft 18 of the piston is provided with marks or other suitable indications thereon indicated at 32. These marks are calibrated to give a distance indication from the orbiting satellite to the center of the planet depending upon the position of piston face 21. A suitable readout apparatus for reading out said calibrated marks may be provided by a source of light and photoelectric detector shown at 34 and 36 respectively or by other suitable well known sensing and reading out apparatus.

As will be observed from the geometry of FIGURE 1, light from nearby planet 10 passing through pin hole 16 impinges on face 21 to form an image thereon. The image will, of course, impinge on the thermistor elements mounted on the face 21 of the piston. For purposes of illustration, piston 21 is shown as being movable to different positions indicated at 38 (an inner position) and 40 (an outer position) by the dotted lines, and at a center position of 42.

According to the invention, when the face 21 of the piston is at the center position 42, light from nearby planet 10 passing through the pin hole 16 impinges on the thermistor elements so that the horizon of the planet is on central thermistor element 24. At this position of the piston, the calibrated marks 32 on shaft 18 thereof which are sensed and readout by sensing and detecting apparatus 34 and 36 will provide a direct reading of the distance of the satellite to the center of planet 10. However, when the face 21 of the piston is too close to the planet, say, at position 38, the light from planet 10 passing through pin hole 16 will impinge to produce a greater intensity on the inner thermistor element 22; if the piston is too far from pin hole 16 at position 42, for example, then more light will impinge on the outer thermistor element 26.

According to the invention, means, hereinafter to be described, are provided for comparing the electrical energy relations of the three thermistor elements 22, 24 and 26 in order to provide an electrical energy output for controlling the orientation of the satellite and for providing a feedback control voltage to vary the positioning through motor 20 of shaft 18 of the piston.

The distance calculation which is calibrated for automatic readout on shaft 18 of the piston is apparent from the following analysis of the geometry of FIGURE 1. A line indicating the path of light from the horizon from planet 10 through pin hole 16 is indicated at 44. The horizon line 44 actually represents a line of a cone of lines included in the geometrical rotation of line 44 tangent to planet 10 on dotted line 45. The angle between one of the lines 44 and a radius of planet 10 will, of course, be 90 degrees. A radius of the planet is indicated for example at lines 46. The local vertical, that is, the line between the pin hole detector 14 and the center of the planet 12 is indicated by line 48. When the piston 18 is in position for impingement of the image on central thermistors 24, in the pin hole detector 14, and when shaft 18 is pointing in the direction of line 48, then the angle between horizon line 44 and local vertical 48 is known. This angle is indicated as "a" in the figure. The shaft 18 of the piston may therefore be calibrated in terms of distance as a function of the angle a. Since this calibration is necessarily a function of the radius 46 of the planet 10, shaft 18 must be calibrated for the particular planet the satellite is to orbit. Obviously as angle a increases the distance from the satellite to the planet 10 or the center thereof 12 will decrease. Since the angle a is measurable in the satellite, and since the length of line 46 is known for any planet, there now being two angles and a side of the triangle included by lines 48, 46 and 44 being known, the computation of the distance between the pin hole detector 14 and the center of the planet 10 is obvious.

Figure 2:
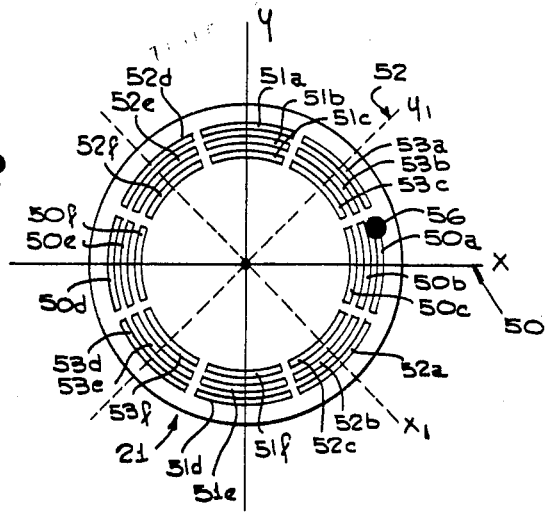
FIGURE 2 is a diagrammatical illustration of the face of the movable piston of the invention.

In order for the face 21 of the piston to be placed in position in the pin hole detector unit so that the horizon image is on the central thermistor element 24, and to correctly align shaft 18 with local vertical 48, or to generate error signals denoting the misalignment thereof relative to the shaft of the piston, the thermistor sensing element and circuitry as shown in FIGURES 2 and 3 respectively will now be explained in conjunction with the graph of FIGURE 4. Referring first to FIGURE 2, there is shown the face of the piston with the thermistor elements mounted thereon. The thermistor elements are arranged in eight groups of three, each coordinate set of four groups defining a coordinate axis. The reason for using two sets of thermistors in order to define two sets of coordinate axes is to provide an alternate set of thermistor units should there appear on the image of a thermistor element of one set the image of the sun, moon or some other image producing ambient light. As shown in FIGURE 2 the X and Y axes therein include the thermistor elements indicated by 50. The alternate coordinates include the thermistor elements indicated generally at 52. Each of the eight groups of three thermistors has an outer thermistor, a central thermistor and an inner thermistor. Each set of four thermistor groups is divided into opposing sections, that is, the opposing groups on the X axis, Y axis; the other set of four thermistor groups is also divided into two opposing sections, that is, those opposing on the $X_1$ axis and $Y_1$ axis respectively. Those thermistor elements on opposite sides of the Y axis and along the X axis are indicated on one side as 50a, 50b and 50c for the outer, central and inner thermistors, respectively. The other group of three thermistor elements located in opposition to elements 50a, 50b and 50c are designated 50d, 50e and 50f, respectively for the outer, central and inner thermistor elements. In a similar manner, those opposing thermistor elements along the Y axis are numbered 51a, 51b and 51c for the outer, central and inner thermistor elements, respectively, and 51d, 51e and 51f for the opposing respective group. The thermistor elements associated with the $X_1$, $Y_1$ coordinates for the respective thermistor elements on opposing sides are indicated as follows: 52a, 52b and 52c for the outer central and inner thermistors, respectively and on the opposing side 52d, 52e and 52f for the respective thermistor elements. The opposing thermistor elements on the $Y_1$ axis are indicated at 53a, 53b and 53c respectively on one side and 53d, 53e and 53f on the other side of the $X_1$ axis. The center of the piston face 21 is indicated at 54, and is coaxial with shaft 18 as shown in FIGURE 1. An image due to the effects of moonset or sunset impinging on piston face 21 is illustrated exemplary as being impinged upon thermistor elements 50a and 50b and is indicated at 56.

The means to compensate for the impinging image 56 will be explained in conjunction with FIGURES 3 and 4. It will be understood that the size of the piston face and the relative distances between the thermistor elements for the coordinates 50 and 52 mounted thereon are such that the size of an image 56 due to moonset or sunset will be able to fall on only one group of thermistor elements of one coordinate system. Since it is the energy difference relationship among the thermistor elements of each coordinate group that is being compared, it is clear that the impingement of an image such as 56 would cause a spurious result leading to incorrect information. By providing as shown in FIGURE 2 an alternate group of thermistor elements associated with another axis upon which an image such as 56 may not simultaneously impinge, the spurious effects thereof may be avoided.

As previously pointed out, the reception of an image on the thermistor elements will be so disposed that if the piston face 21 is closer to pin hole 16 as shown in FIGURE 1 the inner thermistor elements would receive a greater amount of light than the center thermistors and the outer thermistors. If piston face 21 were too distant from pin hole 16 the outer thermistors would receive a relatively greater amount of light than in either the center or forward positions of the piston face. According to the invention, use is made of the fact that the energy relations between the three concentric rings of thermistor elements will vary according to the position of the piston face. Taking for an illustrative example those thermistor elements opposing each other on the X axis, that is, thermistor elements 50a, 50b and 50c, opposed by elements 50d, 50e and 50f, it will be seen that the intensity of the image on thermistor elements 50c and 50f will be considerably greater than those of 50e and 50b or 50a and 50d when the piston face 20 is in its center or forward position closest to the pin hole 16. Since a voltage is developed across each thermistor element proportional to the heat energy incident thereon, if the electrical energy of the outer thermistor elements 50a and 50d are subtracted from each of the inner and central thermistor elements, each subtraction being done separately on opposing sides of the face 21, and if the electrical energy of the inner and central thermistor elements are each attenuated by the proper amount of resistance, a condition may be derived so that the subtraction of the electrical energy representing the light intensity on the outer thermistor elements from the inner and center thermistor elements respectively will be zero when the piston face 21 is in position in the pin hole detector such that the horizon image appears on the central thermistor. This is illustrated by the graph shown in FIGURE 4 to which reference is now briefly made for purposes of explanation.

Figure 4:
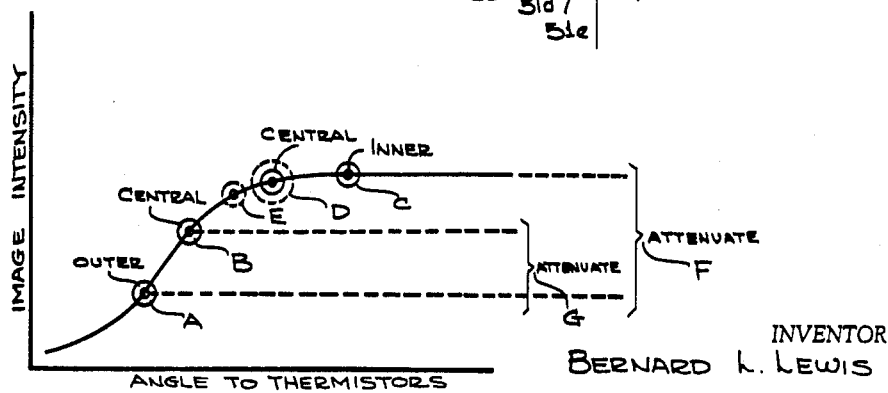
FIGURE 4 is a graphical illustration of the operating principles of the invention.

The graph of FIGURE 4 represents the plot of the light intensity curve which may be also represented by the electrical energy curve corresponding thereto, vs. the angle of lines such as line 44 of FIGURE 1 to the piston face 21. As shown in FIGURE 1 when the piston face 21 is in position so that the horizon image is on the central thermistor, the line 44 impinges directly upon the central thermistor elements. The energy conditions of the thermistor elements of the three concentric circles respectively will be indicated by the appropriately labeled points in FIGURE 4. When the piston is in its position so that the horizon image appears at 42 in FIGURE 1, line 44 to the central thermistor is the horizon of the orbited planet. The intensity of the image picked up by the central thermistor representing the horizon will obviously be less than that picked up by the inner thermistor since the inner thermistor will be "seeing" a brighter image of reflected light from the body, say, a planet. The outer thermistor elements will be seeing the darkened image outside of the horizon of the planet, and therefore, the image intensity thereon will be considerably less than that of the central and inner thermistor elements. This position of piston face 21 is indicated in the graph of FIGURE 4 wherein the image intensity of the outer thermistor is indicated at A, the image intensity of the central thermistor is indicated at B, and the image intensity of the inner thermistor is indicated at C. D indicates the image intensity of the central thermistors when the piston face 21 is too close to the pin hole 16. E represents the image intensity of the outer thermistor when the piston face 21 is too far away from the pin hole 16. Thus, it will be appreciated that when the piston face 20 is in the proper position with relation to pin hole 16, there is a considerable or maximum difference between the image intensities on the three thermistor elements, that is the outer, inner and central thermistor elements. By attenuating the electrical energy representing the intensities of the inner and central thermistor elements to a degree proportional to the positions on the energy curve as shown in FIGURE 4 at positions A, B and C, as represented for example in FIGURE 4 by the brackets F and G, then the resultant energy difference when the energy of the outer thermistor element when subtracted from the inner and central thermistor elements will be zero. The subtraction of the energy level of the outer thermistor element from the inner and center thermistor elements respectively, is carried out for each group of three thermistor elements, and thus, is carried out eight times in the operation of the invention.

Referring more particularly to FIGURE 3, the thermistor elements shown in FIGURE 2 for coordinates 50 and 52 are shown to the left in FIGURE 3 and are indicated by the small circles having the same reference numbers as the thermistor elements of FIGURE 2. The groups of thermistor elements are arranged in opposing sets as indicated by the brackets 58 and 60 for the X, Y coordinate system, and the brackets 62 and 64 for the $X_1$, $Y_1$ system of coordinates. The large bracket indicated by the reference numeral 50 indicates as in FIGURE 2 the X, Y coordinate system and at 52, the $X_1$, $Y_1$ coordinate system.

The apparatus for subtraction for each group of three thermistor elements is the same and will therefore be described only in conjunction with thermistor elements 50a, 50b and 50c. The output from outer thermistor 50a is fed directly into subtractors indicated at 66 and 68. The output from inner thermistor 50c and central thermistor 50b are attenuated by different amounts suitable so that when the piston face 21 is in position where the horizon image appears on the central thermistors, the subtraction of the output of thermistor 50a from those of 50b and 50c is zero. The attenuating resistances for thermistors 50b and 50c are indicated at 70 and 72, respectively. The attenuated output from central thermistor 50b is fed into subtractor 66 and the attenuated output of thermistor 50c is fed into subtractor 68. In subtractors 66 and 68 the output of thermistor 50a is subtracted from the respective attenuated outputs of thermistors 50b and 50c. The outputs of subtractors 66 and 68 are fed to a further subtractor 74. In exactly the same manner, the foregoing operation is carried out for opposing thermistor elements 50d, 50e and 50f of the opposing pair 58. The output of subtractor 74 for each of the thermistor groups is fed to a gain control 76 which provides a gain inversely proportional to the amplitude of the signal from the central thermistor 50b. The purpose of supplying the gain control inversely proportional to the outputs of thermistor 50b is to compensate for darker and lighter regions on a body such as on a planet due to daybreak and nightfall. Thus, for example, if on one side of the planet 10 the image impinging on thermistors 50a, 50b and 50c is brighter than the other side the image of which appears on opposing thermistor elements 50d, 50e and 50f, by providing a gain control inversely proportional to the amplitudes of the images, the outputs of subtractor 74 may be normalized so as to provide compensated output voltages therefrom as if the planet reflected uniform light. The ouputs of gain control 76 are then fed to an adder 78.

In exactly the same manner, the outputs of thermistors 51a, 51b and 51c are fed to an adder 79 with the opposing group of thermistors 51d, 51e and 51f, the foregoing thermistor elements representing those which are on the Y axis of the thermistor elements associated with the X, Y coordinates indicated by the large bracket 50. The outputs of the adders 78 and 79 which indicate the X axis and Y axis piston position indicating voltages, are combined at a junction 80. The voltages from adders 78 and 79 represent an indication of the position of the piston face 21. If the piston face 21 is perpendicular to the local vertical and the horizon image is on the central thermistor of each group, the output of adders 78 and 79 will be zero. If the piston is too far away from the pin hole the outputs of adders 78 and 79 will be negative; if the piston is too close to the pin hole, the outputs of the adders 78 and 79 will be positive.

In a manner exactly like that for the thermistor opposing pairs represented by brackets 58 and 60 of the X, Y coordinate system, the compared outputs of the thermistor pairs 62 and 64 representing the $X_1$, $Y_1$ coordinates 52 are produced, there being an output derived at a junction 80' in a manner similar to that derived at 80.

Since, however, only one of the X, Y or $X_1$, $Y_1$ coordinate pairs is used at a time, circuitry is necessary to decide which of the coordinates is to be used. This depends upon the existence of an image on the thermistors due to sunset on the orbited planet. It should be appreciated that the sun imaging directly on any of the thermistor groups produces much more energy at that thermistor group than is produced as a result of light emitted or reflected from the orbited planet at the other groups. The sun's image, however, is considerably smaller than that of the orbited body, as explained previously, and can be eliminated if only one set of coordinate thermistors is utilized, i.e., either the X, Y or $X_1$, $Y_1$ thermistors. In order to carry out the decision of which coordinate system to use, the outputs of the central thermistor of each thermistor group of three are fed into an adder 82 for the X, Y coordinate thermistors, and into an adder 82' for the $X_1$, $Y_1$ coordinate thermistors. If an image of the sun appears on one of the thermistor coordinate groups, then it is clear that the energy output of that group upon which the image appears will be higher than the energy output of the other coordinate groups. If such is the case, then the sum of the added outputs of one of the adders 82 or 82' will be higher. In order to discriminate when one of the outputs of the adders 82, 82' is higher, the output of adder 82 is inverted at inverter 84. The outputs of inverter 84 and adder 82' are then combined in adder 86. If the output of adder 82' is higher the output of adder 86 will be positive, but if the output of inverter 84 is greater, then the output of adder 86 will be negative.

The output of adder 86 is applied to a pair of gates 88 and 90. Another input to gate 88 is the output from junction point 80 and another input to gate 90 is the output from junction point 80'. If the output of adder 86 is positive, thereby indicating the existence of a sun image on the thermistors of coordinates group $X_1$, $Y_1$, then the gate 90 is closed and the gate 88 is opened. If the output of adder 86 is negative, then gate 88 is closed and gate 90 is opened.

The foregoing circuit control of gates 88 and 90 provides a control decision based upon the existence of an image of the sun on one of the coordinate group thermistors. It is appreciated that by utilizing the coordinates whose thermistor output is of lesser absolute voltage, then this thermistor group will not have the image of the sun on it. The outputs of gates 88 and 90 are fed to a motor to control the positioning of the piston through linkage diagrammatically indicated at 92 and the piston at 94.

In addition to the control of the motion of the piston 94 by the outputs of the coordinate systems, there is also provided X and Y coordinate error signals for orientation control of the orbiting satellite. These control signals may be used for a number of purposes such as for example to position a satellite in its orbit so that piston shaft 18 is coaxial with the local vertical, or for some local command control function. The X and Y coordinate error voltage signals represent the angular offset of the piston face of the piston from a plane perpendicular to the local vertical, or the offset of the shaft of the piston from the local vertical. The X and Y error control signals must be derived from those coordinates on which there is no sun image to prevent spurious results.

To accomplish the foregoing, another output is taken from adder 86 and is supplied to four gates indicated as gates 96, 98, 100 and 102. Returning momentarily to each of the opposing thermistor groups, in addition to the outputs provided at 80 and 80' for the two opposing sets of thermistor coordinates, there is provided at a subtractor 104, for the X axis opposing a pair of thermistor groups, an output dependent upon the intensity from the voltage of the opposing thermistor groups. Outputs from each of the opposing pairs of thermistor groups are fed respectively to subtractors 104, 106, 104', and 106'. The outputs of subtractors 104 and 106 are associated with the X and Y coordinate group of the coordinate group of thermistors indictaed at 50. The outputs of subtractor 104' and 106' are associated with the alternate coordinate group 52. The outputs from subtractors 104 and 106 are fed into gates 96 and 98, respectively and the outputs of subtractors 104' and 106' are fed to gates 100 and 102, respectively. If the output of adder 86 is indicating an image of the sun appearing on the coordinate group 52, then gates 100 and 102 are closed and gates 96 and 98 are opened, and the inputs X and Y to gate 96 and 98 are fed to an output phase detecting circuit to be described hereinafter. If the output of adder 86 is negative, thereby indicating an image of the sun on the coordinate group of thermistors 50 then gates 96 and 98 are closed and gates 100 and 102 are opened. However, if gates 100 and 102 are opened for the $X_1$, $Y_1$ coordinate system, then those coordinates must be transformed into equivalent coordinates of the X and Y system. In order to carry this out, a resolver circuit is provided following gates 100 and 102. The purpose of this resolver circuit is to carry out the following transformation of coordinates:

$$X = Y_1 \cos 45° + X \cos 45°$$

and $$Y = Y \cos 45° - X_1 \cos 45°$$

The foregoing coordinate transformation may be implemented by the provision of an inverter and two adders, the inverter being indicated at 108, one of the adders at 110 and the second adder at 112. The output of gate 100 is fed into inverter 108 which changes the polarity of the signal from gate 100 and feeds it to adder 112. The output of gate 100 is also fed into adder 110. The output of gate 102 is fed into adder 110 and into adder 112. Assuming, then, that the $X_1$, $Y_1$ inputs to gates 100 and 102 have been gated by means of the output from adder 86, then these resolver circuit signals operated on in the resolver including the inverter 108, adder 110 and adder 112 are reinserted into the output at junction points 114 and 116. The cosine factor of the equation on the previous page is a constant of magnitude 0.707 which may be inserted in the proper term in the adder circuits 110 and 112. The requirement for this transformation is due to the relationship between the sensor geometry and the pitch and roll control geometery. If this transformation were not used, the control signals would erroneously stabilize the satellite in the incorrect coordinate axes which obviously would cause a spurious and useless result.

In order that the foregoing system of circuitry may provide a rapid correction and error voltages to the stabilizing orientation system of the satellite, the entire system is synchronized by any appropriate and suitable source of timing signals, and preferably is synchronized by the shutter motor indicated at 118 for the shutter 28 as shown in FIGURE 1. A timing signal from shutter motor 118 is applied in a suitable manner to phase detectors 120 and 122, which are located in the output lines from junction points 114 and 116, respectively. The outputs of junction points 114 and 116 representing the X, Y coordinate error control signals are zero beat in phase detectors 120 and 122 with pulse output timing signals from shutter motor 118. The foregoing detection provides smooth output error control signals indicated as being on leads 124 and 126 for the X and Y axis error control signals respectively. As stated previously, these X and Y error control signals may be used for additional orientation of the piston 94, or may be used to provide error controls in the system as feedback controls, or may be used directly for stabilization of the satellite to align the piston shaft 18 of the pin hole detector coaxially with the local vertical.

In operation, assume that the satellite having pin hole detector unit 14 is orbiting about a planet 10 the center of which is indicated at 12. No matter what the eccentricity of the orbit may be, according to the invention the pin hole detector unit 14 will automatically provide a measure of the distance and direction of a line from the satellite to the center of the planet 12, and will also provide means for producing error control signals to orient or stabilize the satellite. Assume now that the satellite having the pin hole detecting unit 14 is not oriented, that is, that the shaft 18 of the piston inside the pin hole detector is not on the line of the local vertical 48. If such is the case, it will be appreciated that the intensity of the image on the thermistors of the groups on one side of the pin hole detector will be greater than that on the other side of the pin hole detector. Assume now that the energy representative of the image intensity is greater on the thermistor elements 50*d*, 50*e* and 50*f* than those on thermistor elements 50*a*, 50*b* and 50*c*. Assume also that the image intensity is greater on thermistor elements 51*d*, 51*e* and 51*f* than it is on thermistor elements 51*a*, 51*b* and 51*c*. From the geometry as shown in FIGURES 1 and 2, such relative image intensities would mean that the face of the piston is not oriented to be perpendicular to the local vertical 48. In such a situation the output of subtractor 104 would be negative because the image intensity of the thermistor elements 50*d*, 50*e* and 50*f* as shown in FIGURE 3 are subtracted from those of 50*a*, 50*b* and 50*c*. In a similar manner the output of subtractor 106 would also be negative. Therefore the X, Y inputs to gates 96 and 98 would be negative. Since the inputs to gates 96 and 98 are negative, and assuming that an image of the moon or sun is not present on any of the thermistor elements of the coordinate group 50, then the outputs of gates 96 and 98 would be applied directly to the zero beating phase detectors 120 and 122 and thence to the output lines 124 and 126. The negative X, Y error control signals would then be applied to the appropriate control instrumentation in the satellite which could, for example, provide controls to swing the satellite into a position so that the face of the piston is exactly perpendicular to the local vertical 48. In other words, the shaft 18 of the piston would, due to the stabilization of the satellite, be placed coaxially with local vertical 48. When such a correction has been applied to the satellite control gyro or rockets, for example, then the outputs of subtractors 104 and 106 will be zero, and, of course, the inputs to gates 96 and 98 would also be zero indicating zero controls to be applied to the stabilizing means in the satellite.

In a similar manner if the outputs of subtractors 104 and 106 are positive, appropriate control singals to stabilize the satellite in such a manner as to reduce the magnitude of the error control signals until they reach zero would be applied.

Since the circuitry associated with the $X_1$, $Y_1$ coordinate group of thermistors indicated by the large bracket 52 of FIGURE 3 is exactly the same as the circuitry associated with that of the X, Y coordinate group of thermistors 50, the foregoing explanation applies exactly to the coordinate group circuitry for the thermistors of the coordinate group 52. Of course, if the coordinate groups of thermistors 52 are used instead of that of 50, due to the existence of a sun image on the later, then the $X_1$, $Y_1$ error correction signals will be resolved as previously explained through inverter 108, adder 110, and adder 112 so that the control signals applied to stabilize the satellite will not erroneously stabilize the satellite in the incorrect coordinate axes which obviously would cause a spurious and useless result.

In order to calculate the distance of the satellite to the center of the planet, when the piston shaft 18 is coaxial with the local vertical, the sensing elements 34 and 36 will readout the distance to the planet. This is carried out in the following manner. Assuming that the previously described X, Y error control signals have been properly applied, then the shaft 18 of the piston is then coaxial with the local vertical 48. The only control that need be accomplished after such correction is to place the piston face 21 in its proper position so that the central thermistors 24 are in position to receive the image of the horizon of the planet 10. This orientation of the piston face 21 is carried out in the manner described in conjunction with FIGURE 3, the altitude motor 20 controlling the movement of shaft 18 of the piston until the energy difference between the attenuated outputs of the outer thermistor and the inner and central thermistors is zero. This operation is carried out for all of the thermistor groups and, assuming that the X, Y error contol signals have been applied to stabilize the satellite in its position so that the shaft is coaxial with the local vertical 48, then the only further orientation of the piston necessary is to bring it to its proper position inside the pin hole detector so that each of the central thermistors indicated at 24 in FIGURE 1 receives the horizon image of the planet. When the horizon image of the planet is on the central thermistors 24, then it is clear from the geometry of FIGURE 1 that the line 44 makes a right angle with the line 46 which represent a radius of the orbited planet 10. Also, due to the known elements which may be for example the radius of the piston face 21 to the central thermistors, and the distance of the piston from the pin hole 16, the angle a may be readily calculated. Since the angle a has been calculated and since the angle between lines 44 and 46 is a right angle, and since the length of line 46 is known, the distance between the pin hole 16 and the center of planet 12 may be calculated according to obvious geometric principles. Since the location of the piston face 21 is indicative of the size of angle a, then appropriate marks may be made on the shaft 18 of the piston indicating the size of angle a or more appropriately the distance from the pin hole to the center of the planet, since it is obvious that the size of angle a is proportional to the length of line 48.

In summary, it is appreciated that this invention provides means to sense the orientation of a satellite with respect to the local vertical, to produce X and Y coordinate D.C. error signals proportional to any deviation of the orientation of the pin hole detector 14 to the local vertical 48, and to provide a measure of the distance between the satellite and the center of the orbited planet. It will be further appreciated that the present invention may be utilized for determining the direction and distance between the pin hole detector of the invention and any nearby body which has a horizon. Obviously, in a situation where the positions of lines 44 or 48 are known, the apparatus of the invention may be used to measure the radius indicated by line 46 of any planet. Other uses and modifications of the invention will occur to those skilled in the art, the scope of the invention being limited only by the following appended claims.

What is claimed is:

1. A pin hole detector unit for sensing the local vertical between an orbiting satellite and an orbited planet comprising a housing mounted in said satellite and having a pin hole therein, a movable piston mounted in said housing, said piston having a face portion and having a plurality of thermistor elements arranged in concentric groups on said face portion facing said pin hole so that an image of the orbited planet is projected on said face portion, means to compare the image intensities of the orbited planet projected on one concentric group of thermistor elements with that projected on the other concentric groups, and means responsive to said compared image intensities for driving said piston to a position whereat a horizon-including image falls on only one group of said concentric groups said horizon-including image intensity being epual in each thermistor element of said group.

2. Apparatus for detecting the direction and distance of the center of an orbited body to an orbiting vehicle comprising movable means having discrete sensing elements located thereon for sensing energy levels of images from a region including said orbited body, means for comparing energy levels of the images received by the sensing elements in opposing relationships, driving means responsive to a condition of said compared energy levels for positioning said movable means until said compared intensity levels are at a condition of minimum difference, and calibrated means associated with said movable means for rendering a distance indication when said movable means is at the position whereat said minimum difference condition exists, said position also being that whereat the direction of a line between the center of the orbited body and the vehicle is perpendicular to the plane of said elements located on said movable means.

3. Apparatus according to claim 2 wherein said movable means is a reciprocating member and each of said sensing elements located thereon are thermistors, said thermistors being arranged in a plurality of discrete groups thereon.

4. Apparatus according to claim 2 including gain control means connected to said comparing means for compensating for darker images caused by shadows on said orbited body.

5. Apparatus according to claim 2 wherein said movable means is a reciprocating member and each of said sensing elements located thereon are thermistors, and wherein said thermistors are located in discrete groups of three at equiangular intervals thereon.

6. Apparatus according to claim 5 wherein said equiangular intervals are 45°, and wherein each quadrangular set of four groups of thermistors defines two pairs of diametrically opposing sets of thermistors.

7. Apparatus according to claim 2 including selective gating means connected to said sensing elements and to said comparison means for selecting the outputs of a certain plurality of said sensing elements when the total image energy level on the other plurality of sensing elements is higher than that of said selected sensing elements.

8. Apparatus according to claim 7 including resolving means connected to said selective gating means for transforming the outputs of said certain plurality of sensing elements to produce outputs corresponding to those producible by the said other plurality of sensing elements.

9. Apparatus for determining the distance and direction to an object having a discernible horizon, comprising a movable member, a plurality of discrete image sensing elements located thereon and arranged in two symmetrical arrays of four opposing groups of three sensing elements in each group, each array of four groups establishing a pair of coordinate axes, means for substracting the image energy intensity of one sensing element of each group from each of the image energy intensities of the other two sensing elements of that group to produce substracted outputs therefrom, further means to substract said subtracted outputs from each other, gain control means responsive to said further means to compensate for dark areas on said object, comparison means responsive to said gain control means to compare the outputs therefrom corresponding to opposing pairs of groups, gating means responsive to said comparison means and to the sensing elements in all of said groups for selecting compared outputs from only one of said arrays when the image intensity energy on sensing elements of the other of said arrays is greater, resolving means to transform the coordinate axes of one of said arrays to that of the other, means responsive to said resolving means and said gating means for producing error signals corresponding to the orientation of said movable member in relation to said object, adder means responsive to said gain control means to add the outputs of opposing groups of sensing elements to provide control signals, and further gating means responsive to the image intensity energy of sensing elements in each array and responsive to said adder means for selecting control signals associated with only one array for positioning said movable member, whereby responsive to a condition of image energy intensity relationships of the sensing elements of either array, a position of said movable member corresponding to said condition corresponds with the distance therefrom to the center of said object.

10. Apparatus according to claim 9 including image chopping means to periodically interrupt the occurrence of an image on all of said image sensing elements, and means connecting said image chopping means to said means for producing error signals for synchronization thereof.

11. Apparatus for determining the distance and direction from the center of an object having a discernible horizon to the location of said apparatus comprising a housing having a pin hole therein, a movable member in said housing, a plurality of groups of discrete image sensing elements arranged on said movable member in an array of opposing groups, image chopping means to periodically interrupt the occurrence of images from a region including said object on said discrete sensing elements, comparison means connected to each of said discrete image sensing elements in a group for comparing the relative image intensity energies to provide a compared output for each group, the relative image intensity energies corresponding to the position of said movable means in relation to said pin hole, means responsive to the compared output of each group for compensating for relatively darker positions of said image, adding means responsive to the compared output of each opposing pair of groups for adding said compared outputs, and means responsive to said adding means to provide a control signal for controlling the movement of said movable member.

12. Apparatus according to claim 11 including further comparison means for comparing the compared outputs of each pair of opposing groups of sensing elements to produce error signals corresponding to the orientation of said housing.

13. Apparatus according to claim 11 including an additional array of groups of discrete image sensing elements located on said movable member, means to add the image intensity energies of sensing elements in each of said arrays, and means responsive to said adding means to select for utilization only one of said arrays.

References Cited by the Examiner

UNITED STATES PATENTS

| | | | |
|---|---|---|---|
| 2,699,834 | 1/1955 | O'Brien | 88—1 |
| 2,720,810 | 10/1955 | Senn | 33—1 |
| 3,003,378 | 10/1961 | Weems | 33—1 |
| 3,038,077 | 6/1962 | Gillespie et al. | 250—83.3 |

OTHER REFERENCES

Ordway: Ed., "Advances in Space Science," v. 2, Jan. 13, 1961, Academic Press, New York and London, 1960, pages 416–419, (page 418 relied on).

RALPH G. NILSON, *Primary Examiner.*

ISAAC LISANN, *Examiner.*

R. P. WILLIAMS, J. W. LAWRENCE,
*Assistance Examiners.*